(12) United States Patent
Kosugi

(10) Patent No.: US 11,494,471 B2
(45) Date of Patent: Nov. 8, 2022

(54) DISPLAY CONTROLLER FOR DETECTING THE PRESENCE OF A USER

(71) Applicant: LENOVO (Singapore) PTE. LTD., New Tech Park (SG)

(72) Inventor: Kazuhiro Kosugi, Yokohama (JP)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 674 days.

(21) Appl. No.: 16/425,212

(22) Filed: May 29, 2019

(65) Prior Publication Data

US 2019/0384900 A1 Dec. 19, 2019

(30) Foreign Application Priority Data

Jun. 13, 2018 (JP) .............................. JP2018-113012

(51) Int. Cl.
*G06F 21/32* (2013.01)
*G06F 1/3234* (2019.01)
*G01J 5/00* (2022.01)
*G01J 5/06* (2022.01)
*G06F 1/3231* (2019.01)
*G06V 40/19* (2022.01)
*G06V 40/16* (2022.01)
*H04N 5/33* (2006.01)

(52) U.S. Cl.
CPC ............ *G06F 21/32* (2013.01); *G01J 5/0025* (2013.01); *G01J 5/06* (2013.01); *G06F 1/3231* (2013.01); *G06F 1/3265* (2013.01); *G06V 40/166* (2022.01); *G06V 40/172* (2022.01); *G06V 40/19* (2022.01); *G01J 5/064* (2022.01); *H04N 5/33* (2013.01)

(58) Field of Classification Search
CPC ....... G06F 21/32; G06F 1/3231; G06F 1/3265
USPC .......................................................... 726/19
See application file for complete search history.

(56) References Cited

U.S. PATENT DOCUMENTS

| | | | | |
|---|---|---|---|---|
| 11,157,606 | B2 * | 10/2021 | Tussy | ................. G06K 9/00288 |
| 2013/0170839 | A1 * | 7/2013 | Yuan | ...................... H04B 10/50 398/107 |
| 2015/0260580 | A1 * | 9/2015 | Alameh | ................ G06F 1/3231 250/339.02 |
| 2015/0261315 | A1 * | 9/2015 | Alameh | .................. G06F 3/014 345/156 |
| 2018/0341760 | A1 * | 11/2018 | Frempong | ............. H04W 12/61 |
| 2019/0109849 | A1 * | 4/2019 | Frempong | ........... H04L 63/0876 |

FOREIGN PATENT DOCUMENTS

| | | |
|---|---|---|
| JP | 2012215402 A | 11/2012 |
| JP | 2013154713 A | 8/2013 |
| JP | 2016057255 A | 4/2016 |

(Continued)

*Primary Examiner* — Teshome Hailu
(74) *Attorney, Agent, or Firm* — Kunzler Bean & Adamson

(57) ABSTRACT

An apparatus to detect the presence of a user includes, in one embodiment, an infrared sensor that passively detects infrared light radiated from an observation target, a heat source arranged proximate the infrared sensor, and a determinator that determines whether the observation target is present in response to information changing along with an operational situation of the heat source and infrared data detected by the infrared sensor. A method and a computer program product also perform functions of the apparatus.

19 Claims, 7 Drawing Sheets

(56) References Cited

FOREIGN PATENT DOCUMENTS

| JP | 2016142579 | A | 8/2016 |
| JP | 2017041199 | A | 2/2017 |
| JP | 2017138846 | A | 8/2017 |
| WO | 2016135934 | A1 | 12/2017 |

* cited by examiner

DISPLAY CONTROLLER FOR DETECTING THE PRESENCE OF A USER

FIELD

The subject matter disclosed herein relates to information processing devices and more particularly relates to a display controller that detects the presence of a user.

BACKGROUND

Common display device controllers are capable of determining whether a user is absent to shift to a power-saving state based on the determination result. Such controllers switch the display device to a power-saving mode when a detected value of a presence sensor (e.g., a passive infrared sensor) for detecting a person is kept at a predetermined level for a certain period of time. However, such sensors are affected by the heat generated by the display device.

SUMMARY

An apparatus to detect the presence of a user includes, in one embodiment, an infrared sensor that passively detects infrared light radiated from an observation target, a heat source arranged proximate the infrared sensor, and a determinator that determines whether the observation target is present in response to information changing along with an operational situation of the heat source and infrared data detected by the infrared sensor.

The apparatus also includes, in certain embodiments, a temperature detector that detects temperature changing along with the operational situation of the heat source proximate the infrared sensor, and a datastore in which temperature data detected by the temperature detector are stored. The apparatus may also include a datastore in which a correction value for data of the infrared sensor changing along with the operational situation of the heat source is stored, and an operational situation monitor that monitors the operational situation of the heat source. In certain embodiments, the determinator makes the determination in response to a change in infrared information in which the infrared data are corrected based on the operational situation acquired by the operational situation monitor and the correction value stored in the datastore.

In certain embodiments, the heat source is an infrared light source that irradiates infrared light in response to the determinator determines that the observation target is present in a standby state. The apparatus may also include an infrared camera that operates in conjunction with the infrared light source to capture reflected light of infrared light irradiated from the infrared light source, and an authenticator that performs user authentication processing using an image captured by the infrared camera to perform login processing automatically. In certain embodiments, the apparatus also includes an infrared light source controller that stops light emission of the infrared light source upon completion of the login processing by the authenticator. In certain embodiments, the determinator makes the determination in response to the login processing.

In certain embodiments, the authenticator performs logout processing automatically in response to a determination that the observation target is not present after the login processing. The apparatus may include a chassis having a display unit, and wherein the infrared sensor is provided at a position to face a side on which a display surface of the display unit is arranged in the chassis.

A method for detecting the presence of a user is disclosed. In one embodiment, the method includes acquiring infrared data from an infrared sensor which passively detects infrared light radiated from an observation target, acquiring information changing along with an operational situation of a heat source adjacent the infrared sensor, and determining whether the observation target is present in response to the information changing along with the operational situation of the heat source and infrared data acquired by the infrared sensor A program product for detecting the presence of a user is also disclosed. In one embodiment, the program product includes a computer readable storage medium that stores code executable by a processor, the executable code including code to acquire infrared data from an infrared sensor which passively detects infrared light radiated from an observation target, acquire information changing along with an operational situation of a heat source adjacent the infrared sensor, and determine whether the observation target is present in response to the information changing along with the operational situation of the heat source and infrared data acquired by the infrared sensor.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

An embodiment of an information processing apparatus 100 will be described below with reference to the accompanying drawings.

Figure 1:
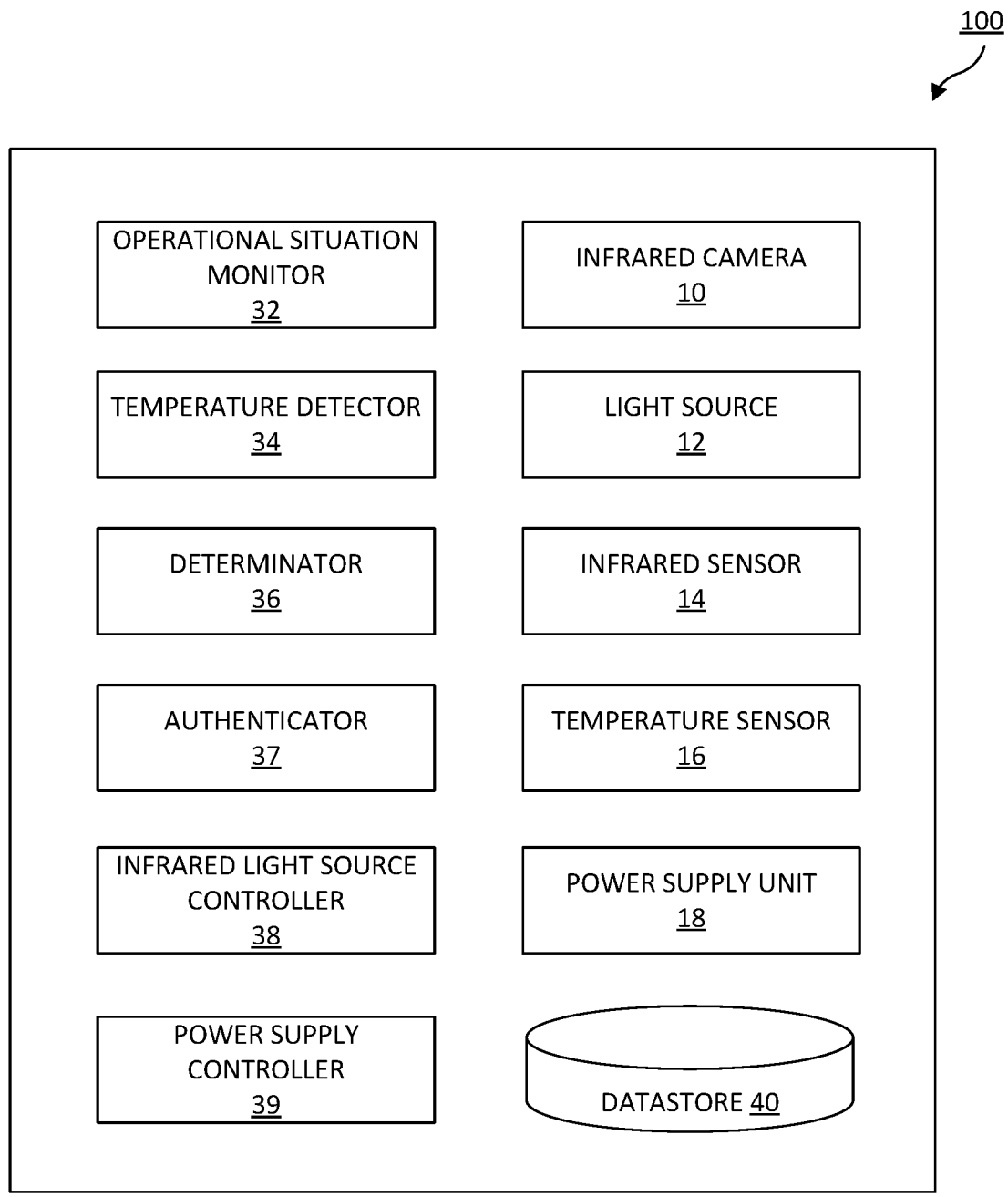
FIG. 1 is a block diagram illustrating an example of an internal configuration of an information processing apparatus.

FIG. 1 is a block diagram illustrating an example of an internal configuration of the information processing apparatus 100. The information processing apparatus 100 is, for example, a terminal apparatus such as a computer. The information processing apparatus 100 is such an apparatus that, when the absence of a user is detected, a state is switched to a lock state not to accept any operation, and when the approach of the user is detected, authentication processing of the user is automatically performed to automatically process a login in order to release the lock state. The login processing is, for example, authentication processing using authentication information on a preregistered user to make user's data accessible.

The information processing apparatus 100 includes, for example, an infrared camera 10, a light source 12, an infrared sensor 14, a temperature sensor 16, a power supply unit 18, a datastore 40, an authenticator 37, an operational situation monitor 32, a temperature detector 34, a determinator 36, an infrared light source controller 38, and a power supply controller 39.

Each of the authenticator 37, the operational situation monitor 32, the temperature detector 34, the determinator 36, the infrared light source controller 38, and the power supply controller 39 is implemented, for example, by a hardware processor such as a CPU (Central Processing Unit) executing a program (software). Part or all of these components may be implemented by hardware (circuit sections including circuitries) such as LSI (Large Scale Integration), ASIC (Application Specific Integrated Circuit), FPGA (Field-Programmable Gate Array), and GPU (Graphics Processing Unit), or may be implemented by software in cooperation with hardware. The program may be prestored in a storage device such as an HDD (Hard Disk Drive) or a flash memory, or may be prestored on a removable storage medium such as a DVD or a CD-ROM, and installed by loading the storage medium into a drive device.

The infrared camera 10 is, for example, a camera for taking an infrared image. The infrared camera 10 takes an image of user's face or iris for authentication to be described later. The infrared camera 10 may be, for example, a 3D camera. The infrared camera 10 is provided in the chassis of the information processing apparatus 100 to be described later. The infrared camera 10 is an active sensor started after a person is detected by the infrared sensor 14. The infrared camera 10 is stopped upon completion of the authentication of the person by the authenticator 37. Further, for example, the infrared camera 10 operates in conjunction with the fact that an application such as a video phone which requires the infrared camera 10 is executed with a user's operation.

The light source 12 is an infrared light source for the infrared camera 10, which emits light or turns the light off in conjunction with the activation of the infrared camera 10. The light source 12 emits light at the time of taking an image with the infrared camera 10 to irradiate the user with infrared light. The light source 12 includes, for example, an infrared LED element (IR LED). The light source 12 is arranged in the neighborhood of the infrared camera 10 inside the chassis. The light source 12 emits light in conjunction with the activation of the infrared camera 10 after the user is detected by the infrared sensor 14 as will be described later.

The light source 12 turns the light off upon completion of user authentication by the authenticator 37. The infrared light irradiated from the light source 12 is reflected on the body surface of the user. Thus, an image of the user is taken with the infrared camera 10 even in an environment with less visible light, which appears dark to the naked eye. In a standby state of the information processing apparatus 100, when the determinator 36 determines that an observation target is present, the light source 12 emits light in conjunction with the activation of the infrared camera 10 to irradiate infrared light. The light source 12 becomes a heat source which changes in temperature along with the operational situation due to a temperature rise according to the light-emitting time.

The infrared sensor 14 is a passive infrared (IR) sensor which passively detects radiant heat (infrared light) radiated from the surface of the observation target (for example, the body of a person). The infrared sensor 14 is, for example, a sensor used to determine whether the person is present in front of the information processing apparatus 100. The infrared sensor 14 is arranged in the neighborhood of the light source 12 as the heat source inside the chassis of the information processing apparatus 100 as will be described later.

The temperature sensor 16 detects temperature around the infrared sensor 14, which changes along with the operational situation of the light source 12. The temperature sensor 16 is, for example, arranged in the neighborhood of the infrared sensor 14. The temperature sensor 16 is, for example, a thermistor having such a characteristic that the electrical resistance value rises according to the temperature rise.

The power supply unit 18 supplies power necessary for the operation of the information processing apparatus 100. The power supply unit 18 is controlled by the power supply controller 39. The power of the power supply unit 18 is adjusted according to each of modes, such as a normal mode, a high-performance mode, a sleep mode, and a hibernation mode, related to the supply of power to the information processing apparatus 100.

The operational situation monitor 32 monitors, for example, the operational situation of the light source 12 as the heat source, and outputs the monitoring results to the determinator 36. The operational situation is, for example, such a situation that the light source 12 emits light or turns the light off. The operational situation monitor 32 monitors, for example, the operational situation of the light source 12 based on the detection result as to the situation that the light source 12 emits light or turns the light off.

The temperature detector 34 uses the temperature sensor 16 to detect, for example, temperature in the neighborhood of the infrared sensor 14, which changes along with the operational situation of the light source 12 as the heat source. The temperature detector 34 makes an A/D conversion of detected values acquired from the temperature sensor 16 to create temperature data and store the temperature data in the datastore 40. The temperature detector 34 stores the temperature data chronologically in the datastore 40.

Based on information changing along with the operational situation of the light source 12 as the heat source, and infrared data detected by the infrared sensor 14, the determinator 36 determines, for example, whether the user as the observation target is present.

Based on temperature data detected by the temperature detector 34 and stored in the datastore 40, the determinator 36 corrects the infrared data acquired from the infrared sensor 14 to create infrared information.

The determinator 36 compares the infrared information with a threshold value to determine whether a person facing the chassis is present. The threshold value is set, for example, as a luminous intensity [cd]. When the infrared information is equal to or more than the threshold value, the determinator 36 determines that a person facing the chassis (information processing apparatus 100) is present. When the infrared information is less than the threshold value, the determinator 36 determines that no observation target is present (see FIG. 5).

When the determinator 36 determines that a person is present, the authenticator 37 performs user authentication processing using an image taken with the infrared camera 10 to perform login processing automatically. The authenticator 37 analyzes the image taken with the infrared camera 10 to perform face authentication or iris authentication processing on the person. For example, when the login processing of the information processing apparatus 100 is requested, the authenticator 37 performs the face authentication or iris authentication processing. When the authentication processing is performed to authenticate the user with face authentication or iris authentication, the authenticator 37 performs login processing automatically.

After performing the login processing, the authenticator 37 releases the lock state of the information processing apparatus 100. The lock state is, for example, a state after the logout processing, in which any operation to the information processing apparatus 100 is not accepted. In the lock state, for example, the information processing apparatus 100 is switched to the power-saving mode, such as the sleep mode or the hibernation mode. The lock state is released when the user is authenticated by the login processing such as face authentication or iris authentication. In this case, the power-saving mode or the like is also released. After the lock state is released, operations to the information processing apparatus 100 can be accepted.

In the state where the lock state is released after the login processing, when the determinator 36 determines that no observation target is present, the authenticator 37 automatically performs logout processing. The logout processing is, for example, a deauthentication processing for cancelling the authority of the user to connect to the information processing apparatus 100. When the logout processing is performed, the authenticator 37 puts the information processing apparatus 100 into the lock state.

The infrared light source controller 38 controls the emission of light of the light source 12. The infrared light source controller 38 causes the light source 12 to emit light in conjunction with the activation of the infrared camera 10 at the time of login processing. Then, the infrared light source controller 38 stops the emission of light of the light source 12 when the login processing by the authenticator 37 is completed.

The power supply controller 39 instructs the power supply unit 18 to control power based on the determination result of the determinator 36. When the determinator 36 determines that no person is present and the information processing apparatus 100 is put into the lock state, the power supply controller 39 switches the power supply unit to the power-saving mode to save power such as the sleep mode, the standby mode, or the hibernation mode. In the power-saving mode, the power supply controller 39 powers off a display unit 102 or puts the display unit 102 into a screen-saving state. When the user is authenticated, the power supply controller 39 instructs the power supply unit 18 to switch from the power-saving mode to a normal power supply mode or the like.

The datastore 40 stores temperature data detected by the temperature detector 34, a correction value for data of the infrared sensor 14 changing along with the operational situation of the heat source, the threshold value, authentication information necessary for user login processing, and information such as a login history and the like. The datastore 40 is a storage device such as an HDD (Hard Disk Drive), a flash memory, or the like.

Figure 2:
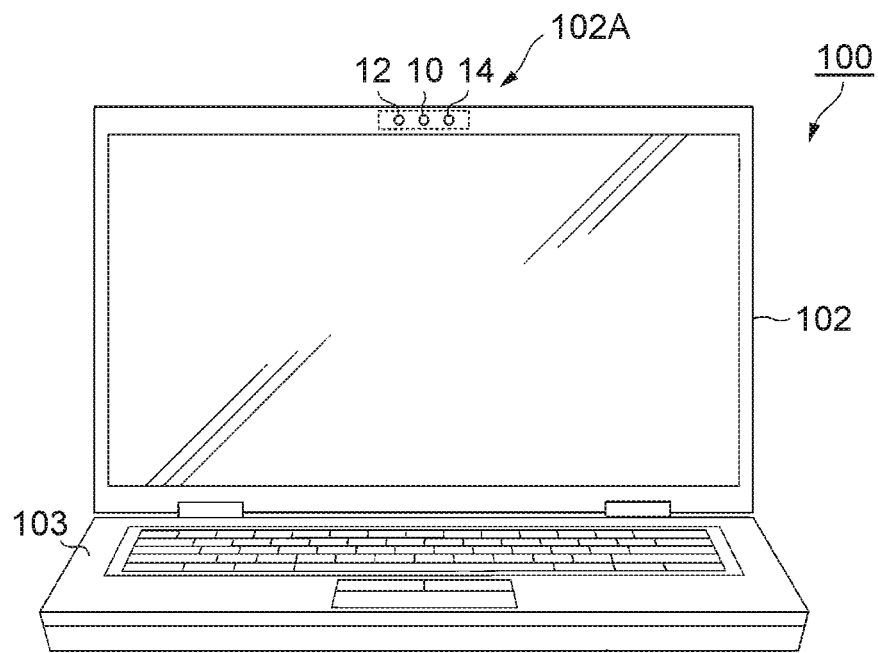
FIG. 2 is a front view illustrating an example of the specific arrangement of each component in the information processing apparatus.

Next, the physical structure of the information processing apparatus 100 will be described. FIG. 2 is a front view illustrating the specific arrangement of each component in the information processing apparatus 100. The information processing apparatus 100 is, for example, a foldable laptop PC. The information processing apparatus 100 is such that the display unit 102 coupled via hinges to a horizontally placed operation unit 103 equipped with a keyboard is foldable. The information processing apparatus 100 is used in such a state that the display unit 102 is unfolded. For the display unit 102, for example, a liquid crystal display, an organic EL display, a touch panel, or the like is used.

In the information processing apparatus 100, for example, the infrared camera 10, the light source 12, and the infrared sensor 14 are provided at the top of the display unit 102 to be aggregated all in a central region 102A. The infrared camera 10 and the light source 12 are provided in the chassis of the display unit 102 at positions to face the display surface. The infrared camera 10 and the light source 12 are, for example, provided individually, but the present disclosure is not limited thereto, and they may be composed of a pair of elements. The infrared camera 10 is arranged in the central region 102A not only to ensure the field of view in order to take an image of the face of the user, but also to confront the face of the user directly in order to take the image of the face of the user from the front.

The light source 12 is provided in the neighborhood of the infrared camera 10 in the central region 102A to face the user's face straight at the time of emitting light in order to irradiate infrared light to the user's face substantially evenly. The infrared light irradiated from the light source 12 hits against the user's face and is reflected so that an image of the user's face will be taken with the infrared camera 10.

It is desired that the infrared sensor 14 should be provided at such a position that makes it easy to detect infrared light radiated from the body surface of the user. Then, considering the shape of the display unit 102 and the need to make right and left detection sensitivities equal to each other, it is desired that the infrared sensor 14 should be arranged in the central region 102A of the display unit 102. The infrared sensor 14 is, for example, provided at a position in the central region 102A of the chassis of the display unit 102 to face a side on which the display surface of the display unit is arranged. For example, when the user approaches the information processing apparatus 100 from the front thereof within a predetermined distance and the infrared sensor 14 detects the user, the infrared sensor 14 outputs a high value equal to or more than the threshold value, while when the user leaves the place beyond the predetermined distance and the infrared sensor 14 no longer detects the user, the infrared sensor 14 outputs a low value less than the threshold value.

Figure 3:
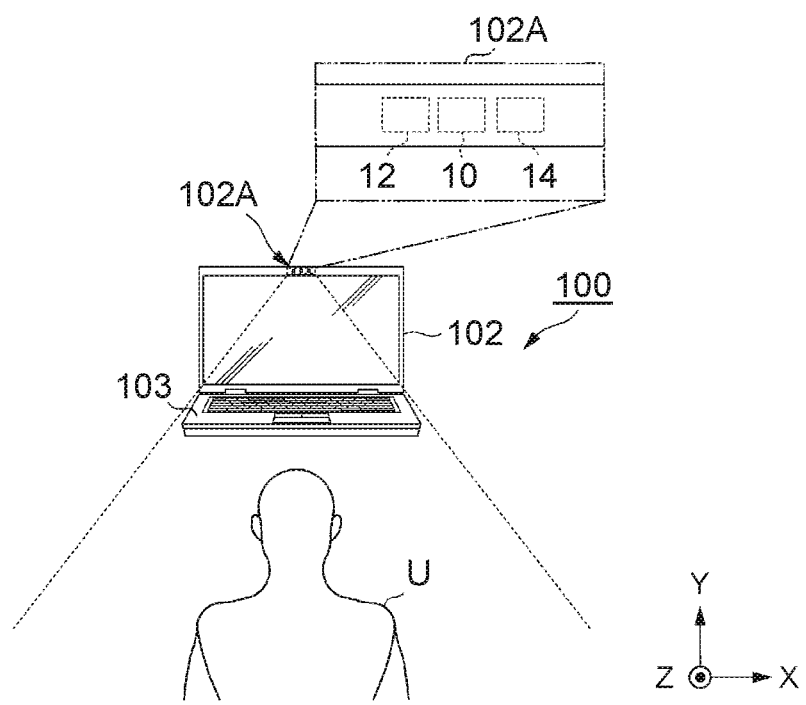
FIG. 3 is a front view illustrating a positional relationship between the information processing apparatus and a user.

FIG. 3 is a front view illustrating a positional relationship between the information processing apparatus 100 and a user U. The user U uses the information processing apparatus 100 in such a state as to confront the unfolded display unit 102 directly. The infrared camera 10 takes an image of the face of the user in such a state that the user U confronts the display unit 102 directly. The light source 12 is controlled by the infrared light source controller 38 to emit light in conjunction with the activation of the infrared camera 10.

The light source 12 produces heat during light emission. When the light source 12 starts emitting light, temperature around the light source 12 rises according to the light emission of the light source 12. Since the infrared sensor 14 and the light source 12 are provided in the central region 102A of the display unit 102, when the light source 12 emits light, the infrared sensor 14 is affected by the temperature of the light source 12 to change the receiving sensitivity. The measures against the changes in receiving sensitivity will be described later.

Next, the operation of the information processing apparatus 100 will be described. In the following description, it is assumed that, in a state where the information processing apparatus 100 has been already activated, the user leaves the information processing apparatus 100, and the information processing apparatus 100 goes into the standby state and further goes into the lock state after the logout processing. The standby state is a mode in which, when there is no input for a given length of time, the datastore 40 and the display unit 102 are put into a sleep state as a power-saving state to reduce power consumption while holding the contents of the working memory, and then when there is any input, this state is returned quickly to the working state. Here, the term "standby state" shall be a so-called modern standby state in which the information processing apparatus 100 continues to connect to a wireless LAN or the like in the background even in the sleep state.

When the user approaches the information processing apparatus 100 put into the lock state in the standby state and takes a seat in front of the information processing apparatus 100, the infrared sensor 14 detects infrared light radiated from the body surface of the user. In this instance, the infrared camera 10 and the light source 12 are put into an operating state, and authentication is started by the authenticator 37. When the light source 12 starts emitting light, temperature in the neighborhood of the infrared sensor 14 rises.

The operational situation monitor 32 creates infrared data based on output values of the infrared sensor 14. The operational situation monitor 32 outputs the created infrared data to the determinator 36. The temperature detector 34 creates temperature data based on output values of the temperature sensor 16, and stores the temperature data in the datastore 40 to create a temperature table.

The determinator 36 refers to the temperature table stored in the datastore 40, and determines a temperature change of the infrared sensor 14 from a base time base time. For example, the determinator 36 compares the temperature of the infrared sensor 14 at the base time with the current temperature of the infrared sensor 14, and when determining that the temperature changes, the determinator 36 corrects the infrared data according to the temperature change by a predetermined correction method to create infrared information. The correction of the infrared data will next be described.

Figure 4A:
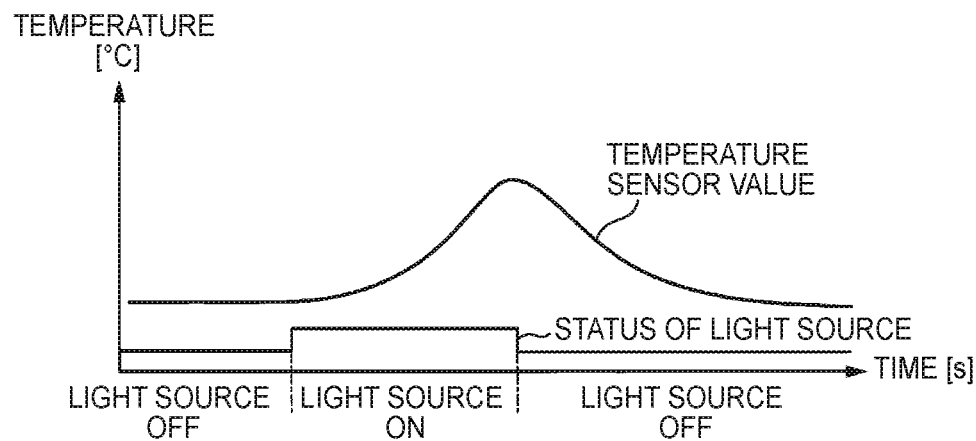
FIG. 4A-4C contains graphs illustrating a relationship between an infrared sensor and temperature.
Figure 4B:
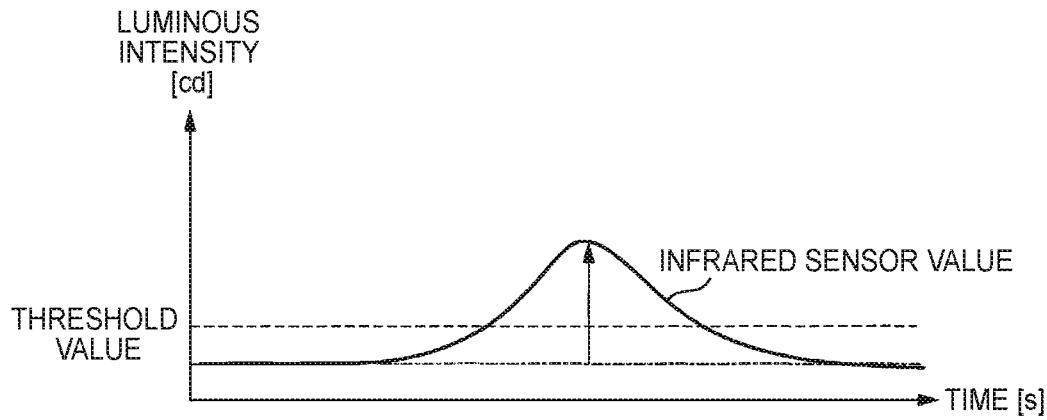
Figure 4C:
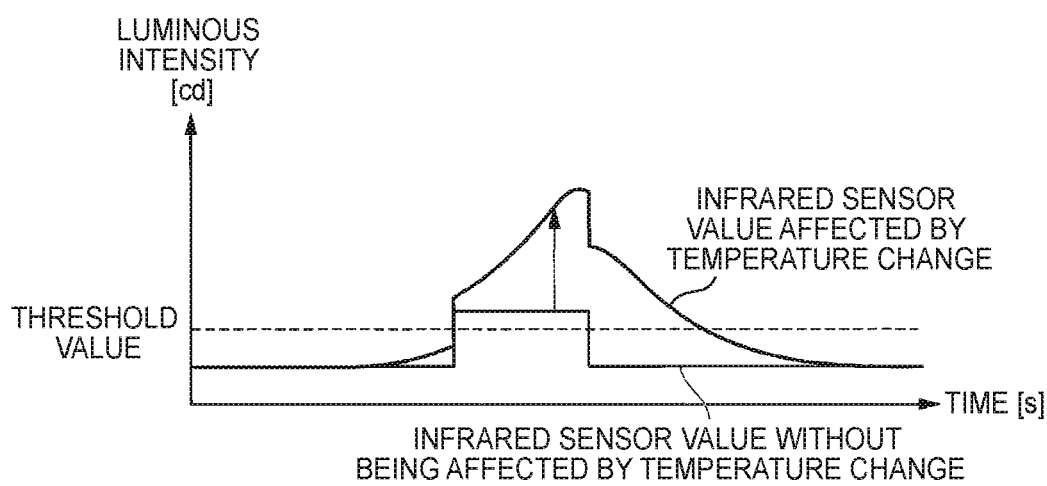

FIG. 4A-4C contains graphs illustrating a relationship between the infrared sensor 14 and temperature. FIG. 4A illustrates temperature data detected by the temperature sensor 16. When the light source 12 starts emitting light in conjunction with the activation of the infrared camera 10, the light source 12 produces heat, and temperature around the light source 12 rises over time. Then, after the light source 12 stops emitting light, temperature around the light source 12 drops over time. When the light source 12 does not emit light after the temperature drops, the output values of the infrared sensor 14 are output without being affected by any temperature change.

FIG. 4B illustrates output values of the infrared sensor 14 when there is a temperature change. When the infrared camera 10 is activated, the infrared sensor 14 is affected by a temperature rise of the light source 12 which emits light in conjunction with the activation of the infrared camera 10 to output values drifted to high values according to the temperature rise. When the output values change due to the temperature, the infrared sensor 14 may output an output value equal to or more than the threshold value even if the user is not detected. Further, after the light source 12 starts emitting light in conjunction with the activation of the infrared camera 10, the infrared sensor 14 is put into a state where the temperature of the infrared sensor 14 rises. After the light source 12 stops emitting light in conjunction with the deactivation of the infrared camera 10 in the state where the temperature of the infrared sensor 14 rises, the temperature of the infrared sensor 14 drops so that the infrared sensor 14 may be such that the temperature of the infrared sensor 14 is changed from the state of being equal to or more than the threshold value to a state of being less than the threshold value.

In this case, when the output values of the infrared sensor 14 are used as they are, it may be mis-detected that the user is present even though the user is not present, or it may be determined that the user has left even though the user was not present. FIG. 4C illustrates output values when the infrared sensor 14 reacts to a person while temperature is changing. As illustrated in the figure, the output values of the infrared sensor 14 are affected by the temperature changes, and the output values may become equal to or more than the threshold value even when no person is detected. The output values of the infrared sensor 14 may also be equal to or more than the threshold value even when the user has left. Therefore, there is a need to correct infrared data created from the output values of the infrared sensor 14 in consideration of the influence of temperature.

For example, the determinator 36 acquires information changing along with the operational situation of the light source 12 as the heat source, and corrects infrared data detected by the infrared sensor 14 based on the acquired information to create infrared information. The infrared information is obtained by removing, from the infrared data, the influence of a temperature rise due to the light source 12 to assume the absence of the light source 12 in order to calculate virtual infrared data capable of being output by the infrared sensor 14. Based on a change in created infrared information, the determinator 36 determines whether the user to be observed is present.

The determinator 36 acquires, from the infrared sensor 14, temporal infrared data around the outside of the chassis. The term "around the outside of the chassis" means a predetermined area including a seating position of the user in a use state. The determinator 36 refers to the temperature table stored in the datastore 40 by the temperature detector 34 to acquire temperature data in an area including the infrared sensor 14 in the chassis of the display unit 102.

The determinator 36 refers to the temperature table stored in the datastore 40 to determine a temperature change of the infrared sensor 14 from the base time. For example, when comparing the temperature of the infrared sensor 14 at the base time with the current temperature of the infrared sensor 14 and determining that the temperature changes, the determinator 36 corrects the infrared data according to the temperature change based on the temperature table to create infrared information.

For example, the determinator 36 corrects the infrared data by multiplying the acquired infrared data by a correction coefficient using temperature as a parameter to create infrared information. The correction coefficient is set, for example, based on a correlation between premeasured infrared data and temperature data. The correction coefficient may also be updated appropriately by learning based on measured temperature data and infrared data. Further, the determinator 36 may create the infrared information along with the operational situation of the light source 12 to emit light or turn the light off.

Figure 5:
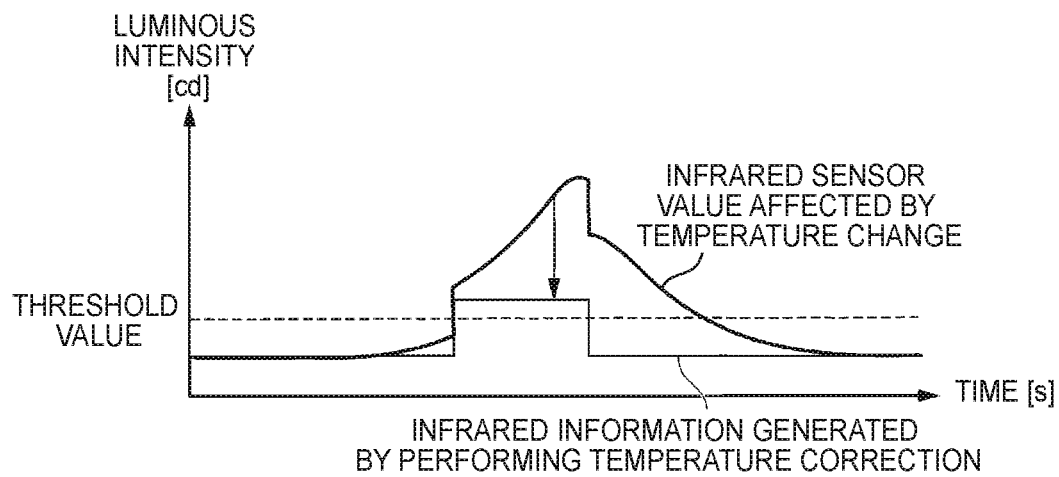
FIG. 5 is a graph illustrating infrared information generated by correcting infrared data.

FIG. 5 is a graph illustrating infrared information generated by correcting infrared data. As illustrated in FIG. 5, the determinator 36 uses temperature data changing according to the operation of the light source 12 to correct infrared data acquired from the infrared sensor 14 by the operational situation monitor 32 to create infrared information corresponding to infrared data (see FIG. 4C) acquired by the operational situation monitor 32 when it is assumed that there is no influence of the light source 12.

Further, based on the correction value preset according to the operational situation of the light source 12, the determinator 36 may correct infrared data of the infrared sensor 14 to create the infrared information. As will be described later, there is a correlation among the operational situation of the light source 12, a change in output value of the temperature sensor, and a change in output value of the infrared sensor 14 (see FIG. 4A and FIG. 4B). Thus, based on the correlation among these, the correction value used to correct the output value of the infrared sensor 14 according to the operational situation of the light source 12 can be preset. After the correction value for the infrared data of the infrared sensor 14 which changes along with the operational situation of the light source 12 is set, correction value data are stored in the datastore 40. The determinator 36 acquires the operational situation of the light source 12 based on the monitoring results of the light source 12 by the operational situation monitor 32. The determinator 36 may refer to the temperature data in the temperature table stored in the datastore 40 in chronological order to determine the operating state of the light source 12.

For example, temporal changes in temperature data around the infrared sensor 14 associated with the light emission pattern of the light source 12 and the elapsed time from the start of light emission, and the elapsed time from the lights-out are measured beforehand or calculated by a simulation to create a temperature change table according to the operational situation of the light source 12. For example, data of the temperature change table include temporal temperature changes from when the light source 12 is turned on to emit light, temporal temperature changes from when the light source 12 is turned off to turn the light off, and correction values for infrared data defined with respect to respective temperatures. The temperature change table is created based on all light emission patterns (operational situations) of the light source 12.

In the light emission patterns of the light source 12, for example, there are basic patterns, i.e., a first state at a cold time when the light source 12 is not in operation, a second state accompanied with temperature rises over time due to light emission of the light source 12 after the cold time when the light source 12 is not in operation, a third state after a further time has elapsed from the second state, in which the light emission of the light source 12 is continued and the temperature is kept constant over time, and a fourth state accompanied with temperature drops over time after the light source 12 turns the light off from the third state. In addition to these states, the light emission patterns also include a fifth state in which the light source 12 turns the light off in the middle of the second state to drop the temperature, a sixth state in which the light source 12 emits light in the middle of the fourth state to rise the temperature, and the like.

A relationship between the light-emitting time of the light source 12 and the temperature in the basic patterns of the second state to the fourth state is acquired from the measurements acquired beforehand or from the simulation results, and stored in the datastore 40 as the temperature change table.

The simulation is done, for example, based on a function expressing a relationship between the temperature and the light-emitting time derived from the measurements. Since a relationship between the light-emitting time of the light source 12 and the temperature in the fifth state and the sixth state can change according to the operational situation of the light source 12, the relationship is acquired, for example, from the simulation results, and stored in the datastore 40 as the temperature change table.

As illustrated in FIG. 4A and FIG. 4B, there is a correlation between the operational situation of the light source 12 and the drift amount of the infrared data. When the drift amount of the infrared data is set to a correction value for the output value of the infrared sensor 14, the correction value for the infrared data according to the operational situation of the light source 12, such as the light emission pattern and the light-emitting time, and the lights-out time, is set as a correction table. In other words, the correction table is information in which the operational situation of the light source 12 is associated with the correction value for the infrared data.

The determinator 36 acquires the monitoring results by the operational situation monitor 32, and refers to the correction table stored in the datastore 40 based on the operational situation (the light emission pattern and the light-emitting time, and the lights-out time) of the light source 12 to acquire a correction value for the infrared sensor 14 according to the operational situation of the light source 12. The determinator 36 may refer to the temperature change table to determine the operational situation of the light source 12.

Based on the operational situation of the light source 12, the determinator 36 reads, from the datastore 40, the correction value according to the operational situation of the light source 12, corrects the infrared data using the correction value, and creates infrared information. From the changes in the created infrared information, the determinator 36 determines whether the user to be observed is present.

The determinator 36 compares the created infrared information with the threshold value, and when the infrared information is equal to or more than the threshold value, the determinator 36 determines that a person is present in front of the information processing apparatus 100.

When the determinator 36 determines that a person is present in front of the information processing apparatus 100, the power supply controller 39 causes the power supply unit 18 to switch to the normal mode based on the determination result.

When the determinator 36 determines that a person is present in front of the information processing apparatus 100, for example, the authenticator 37 activates the infrared camera 10 and the light source 12 in the information processing apparatus 100 after being put into the standby state and further into the lock state, and performs authentication processing based on an image taken with the infrared camera 10 to determine whether the person is the user of the information processing apparatus 100.

For example, the authenticator 37 extracts, based on the brightness of the image, parts matching a pattern of a human face learned in advance. The authenticator 37 detects, for example, feature parts of the face of the person captured, such as eyes, nose, and mouth, based on differences in the brightness of the image taken with the infrared camera 10, and highlights a representative part such as the tip of the nose in the extracted feature parts to set feature points. The authenticator 37 imparts an ID to each feature point to associate the ID with each position in order to create biometric authentication data in which the features of the face to be captured are represented by numerical values.

The authenticator 37 normalizes the position and size of a face region using the biometric authentication data prestored in the datastore 40, the position of each feature point extracted from the face image captured, the distance between feature points, and the like, and then performs "face matching" processing. When the features of the face matches, the authenticator 37 performs authentication processing on the user.

When performing iris authentication processing, the authenticator 37 clips only iris parts from captured images of eyes, for example, based on the brightness of the images, and groups the clipped images into a block. The authenticator 37 quantifies the blocked image and extracts personal feature values to be authenticated. The authenticator 37 compares the extracted feature values with feature values of the prestored images of eyes to be recognized, and when the feature values match each other, the authenticator 37 performs authentication processing on the user. The authenticator 37 may also perform biometric authentication processing using biometric information on any other part.

When authenticating, as the user, the person who is present in front of the information processing apparatus 100 (chassis) as a result of the authentication processing, the authenticator 37 automatically performs login processing on the information processing apparatus 100 to release the lock state in order to put the information processing apparatus 100 into the usable state. The power supply controller 39 powers on the display unit 102.

When the login processing by the authenticator 37 is completed, the infrared light source controller 38 stops the light emission of the light source 12.

When the user cannot be authenticated based on the image taken with the infrared camera 10, the authenticator 37 may attempt face authentication processing plural times. When the user cannot be authenticated after the face authentication is attempted plural times, the authenticator 37 may cause the display unit 102 to display a password entry screen to perform authentication processing on the user through the entry of a password.

When the user is authenticated and the login processing is performed, the information processing apparatus 100 is put into such a state that can accept operations. After that, the user starts using the information processing apparatus 100.

When the user who is using the information processing apparatus 100 operates the infrared camera 10 with any operation, the infrared light source controller 38 causes the light source 12 to emit light in conjunction with the infrared camera 10, and temperature around the light source 12 rises along with the light emission of the light source 12. The infrared sensor 14 is affected by the temperature rise of the light source 12, and the temperature of the infrared sensor 14 rises (see FIG. 4). In the state where the temperature of the infrared sensor 14 rises, when the user leaves the information processing apparatus 100, the infrared data are affected by the temperature rise and hence represent values drifted according to the temperature rise (see FIG. 4). When the user has left the information processing apparatus 100, the infrared sensor 14 detects the disappearance of infrared light radiated from the body surface of the user.

The determinator 36 corrects the infrared data according to the temperature rise, creates infrared information, and determines the presence or absence of the user based on the created infrared information. Thus, even when the temperature of the infrared sensor 14 rises while the information processing apparatus 100 is in use, infrared data are corrected in each case.

The operational situation monitor 32 creates infrared data based on the output value of the infrared sensor 14. The operational situation monitor 32 outputs the created infrared data to the determinator 36. The determinator 36 compares the created infrared information with the threshold value, and when the infrared information is less than the threshold value, the determinator 36 determines that no person is present in front of the information processing apparatus 100.

Based on the output result of the operational situation monitor 32, the determinator 36 determines that the user has left the information processing apparatus 100. When the determinator 36 determines that the user has left the information processing apparatus 100 and no person is currently present, the authenticator 37 automatically performs logout processing to put the information processing apparatus 100 into the lock state. In this instance, the power supply controller 39 powers off the display unit 102 or puts the display unit 102 into a screen-saving state.

After that, in a state where the absence of the user from the information processing apparatus 100 is continued and the temperature of the infrared sensor 14 is declined, the determinator 36 corrects infrared data according to a change in declined temperature to create infrared information, and determines the presence or absence of the user based on the infrared information. When the user approaches the information processing apparatus 100, the determinator 36 compares infrared information created by reflecting the temperature correction with the threshold value. In this case, when the infrared information is equal to or more than the threshold value, the determinator 36 determines that the user is present in front of the information processing apparatus 100.

When the determinator 36 determines that a person is present in front of the information processing apparatus 100, the authenticator 37 activates the infrared camera 10 and the light source 12, and performs authentication processing based on an image taken with the infrared camera 10 as to whether the person is the user of the information processing apparatus 100. Subsequent processing is the same as mentioned above.

Figure 6:
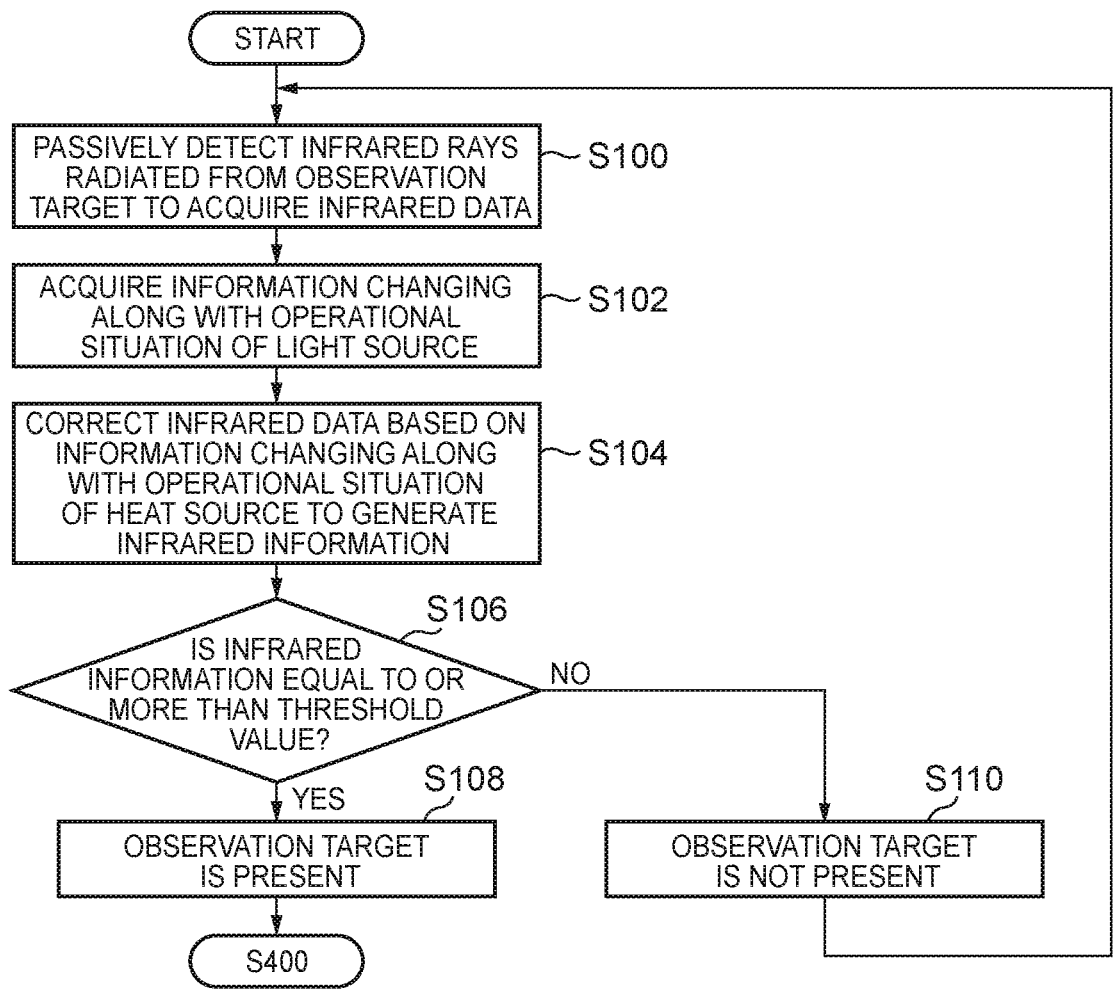
FIG. 6 is a flowchart illustrating an example of a flow of processing for temperature correction of infrared data performed on the information processing apparatus.

Next, a flow of processing for determining the presence of an observation target to be performed on the information processing apparatus 100 will be described. FIG. 6 is a flowchart illustrating an example of the flow of processing for determining the presence of the observation target to be performed on the information processing apparatus 100.

The infrared sensor 14 passively detects infrared light radiated from the observation target to acquire infrared data (step S100). The determinator 36 acquires information changing along with the operational situation of the light source 12, such as temperature data detected by the temperature detector 34 and stored in the datastore 40 (step S102).

Based on the information changing along with the operational situation of the light source 12, the determinator 36 corrects infrared data acquired from the infrared sensor 14 to create infrared information (step S104). Next, the determinator 36 determines whether the created infrared information is equal to or more than the threshold value (step S106). When the determination in step S106 is affirmative, the determinator 36 determines that the observation target is present (step S108).

After step S108, the processing in the flowchart proceeds to processing in step S400 to be described later. When the determination in step S106 is negative, the determinator 36 determines that the observation target is not present (step S110). After step S110, the processing returns to step S100.

Figure 7:
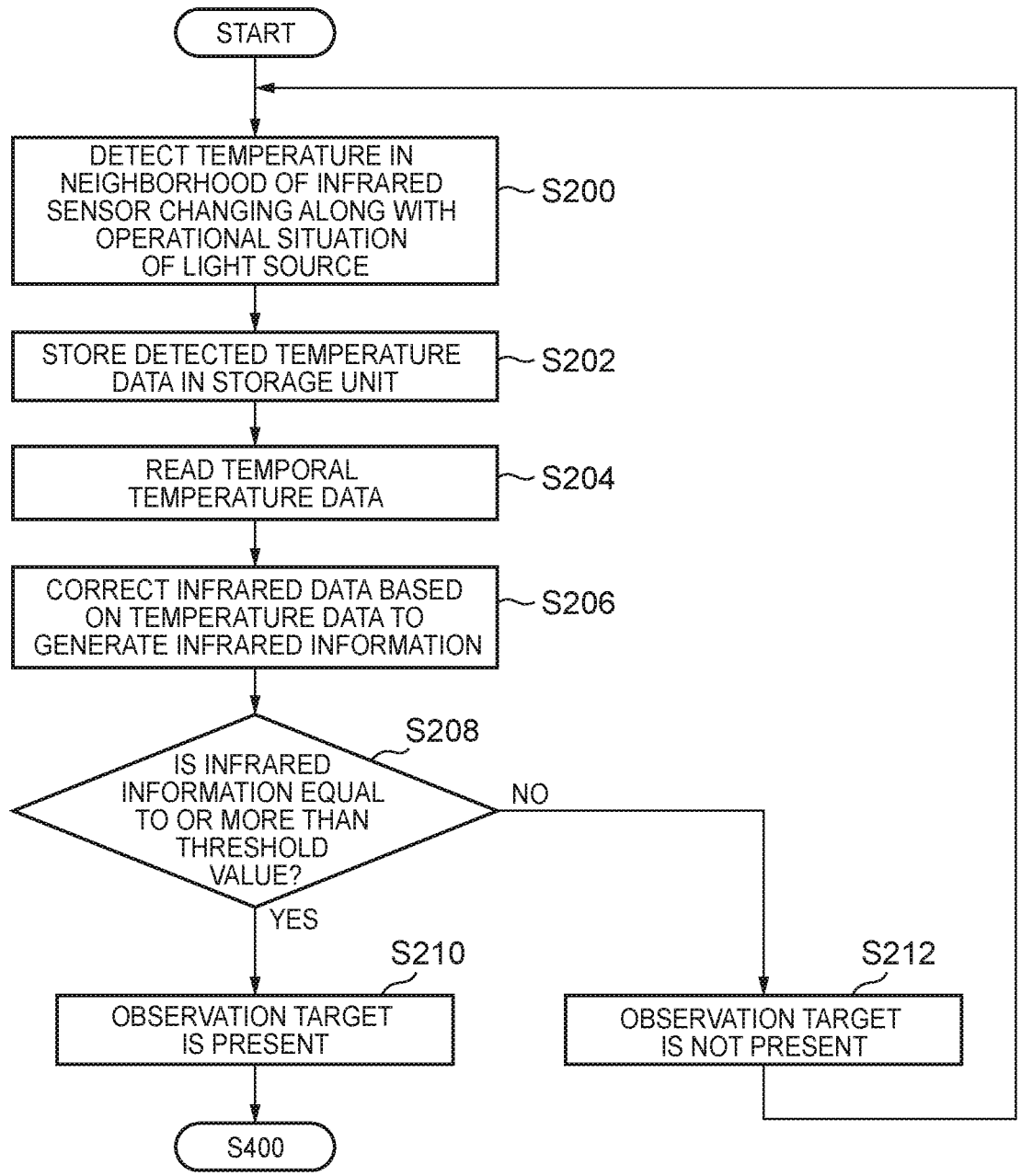
FIG. 7 is a flowchart illustrating an example of a flow of detailed processing for determining the presence of an observation target performed on the information processing apparatus.

Next, a flow of detailed processing for determining the presence of the observation target performed on the information processing apparatus 100 will be described. FIG. 7 is a flowchart illustrating an example of a flow of detailed processing for determining the presence of the observation target performed on the information processing apparatus 100.

The temperature detector 34 detects temperature in the neighborhood of the infrared sensor 14, which changes along with the operating state of the light source 12 (step S200). The temperature detector 34 stores detected temperature data in the datastore 40 (step S202). The determinator 36 reads, from the datastore 40, temporal temperature data (step S204). Based on the read temperature data, the determinator 36 corrects infrared data by multiplying the acquired infrared data by a correction coefficient using the temperature as a parameter to create infrared information (step S206).

The determinator 36 determines whether the created infrared information is equal to or more than the threshold value (step S208). When the determination in step S208 is affirmative, the determinator 36 determines that the observation target (user) is present (step S210). After step S210, the processing in the flowchart proceeds to processing in step S400 to be described later. When the determination in step S208 is negative, the determinator 36 determines that the observation target is not present (step S212). After step S212, the processing returns to step S200.

Figure 8:
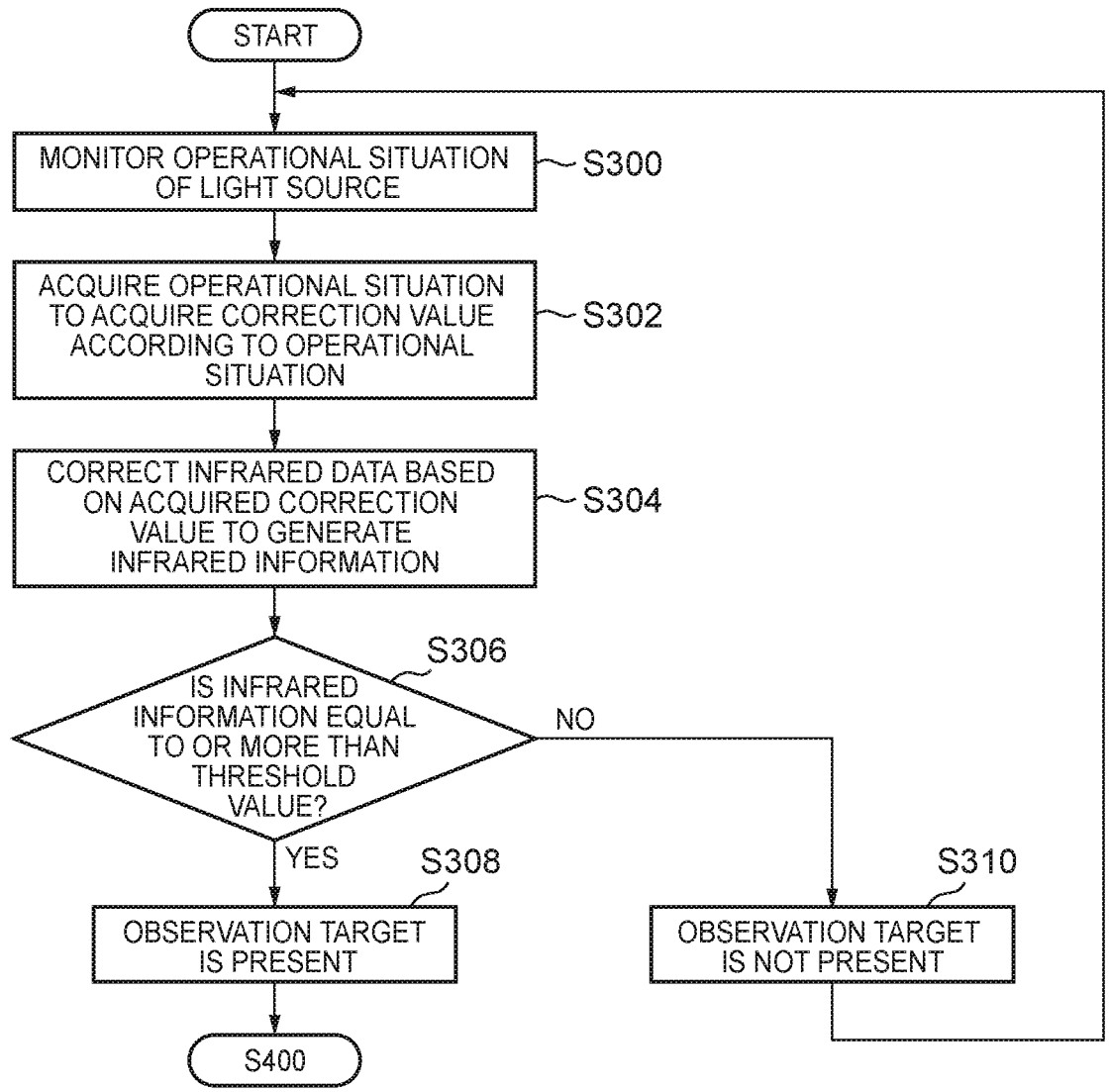
FIG. 8 is a flowchart illustrating another example of the flow of processing for determining the presence of the observation target performed on the information processing apparatus.

Next, another example of the flow of processing for determining the presence of the observation target performed on the information processing apparatus 100 will be described. FIG. 8 is a flowchart illustrating another example of the flow of processing for determining the presence of the observation target performed on the information processing apparatus 100.

The operational situation monitor 32 monitors the operational situation of the light source 12 (step S300). The determinator 36 acquires the monitoring results of the operational situation monitor 32, refers to the correction table stored in the datastore 40 based on the operational situation of the light source 12, and acquires a correction value for the infrared sensor 14 corresponding to the operational situation of the light source 12 (step S302). The determinator 36 corrects infrared data based on the acquired correction value to create infrared information (step S304).

The determinator 36 determines whether the created infrared information is equal to or more than the threshold value (step S306). When the determination in step S306 is affirmative, the determinator 36 determines that the observation target is present (step S308). After step S308, the processing in the flowchart proceeds to processing in step S400 to be described later. When the determination in step S306 is negative, the determinator 36 determines that the observation target is not present (step S310). After step S310, the processing returns to step S300.

Figure 9:
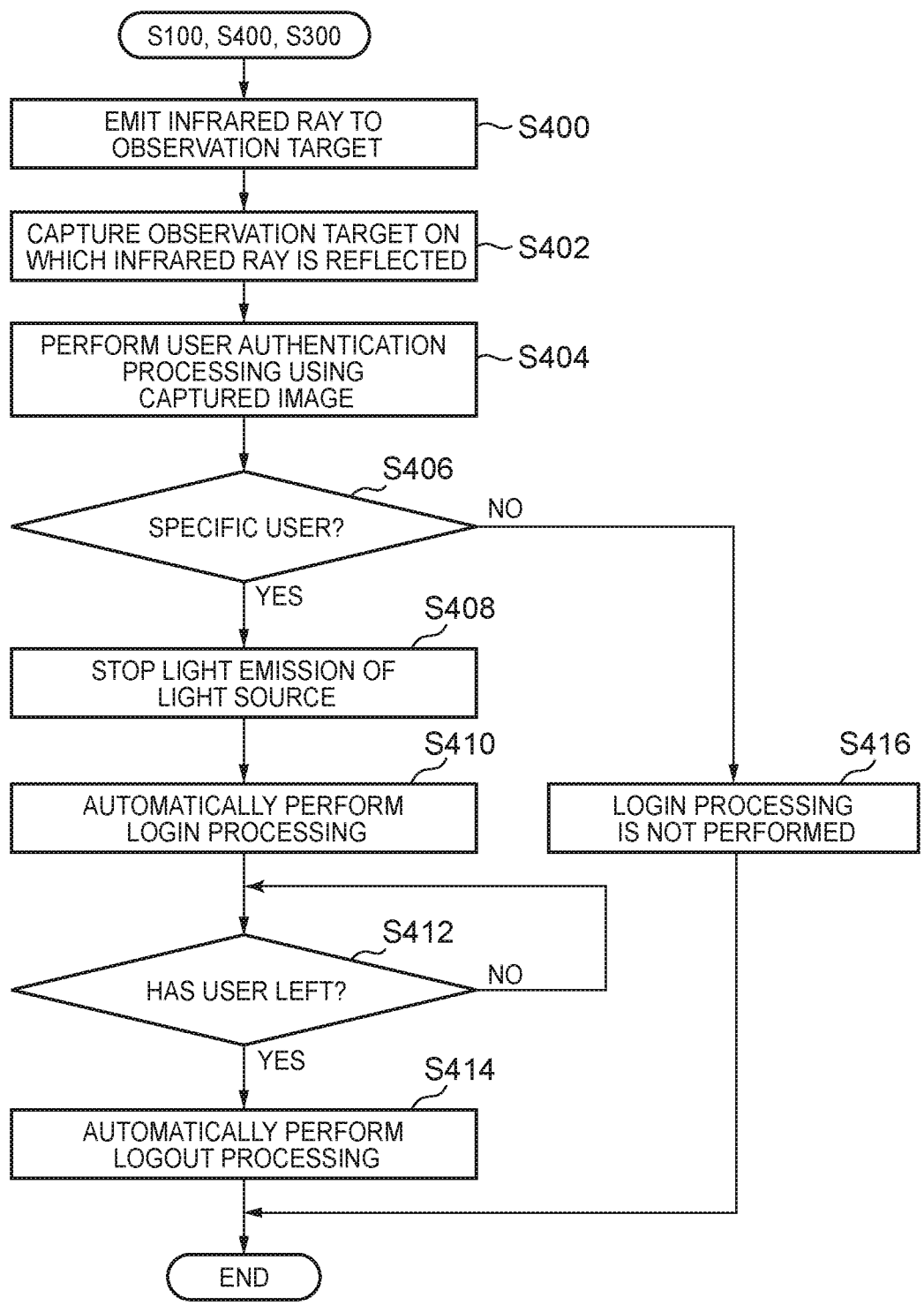
FIG. 9 is a flowchart illustrating an example of a flow of processing after the presence of the observation target is determined.

Next, a flow of processing after the presence of the observation target is determined will be described. FIG. 9 is a flowchart illustrating an example of a flow of processing after determining the presence of the observation target.

The infrared light source controller 38 causes the light source 12 to emit light to irradiate infrared light to the observation target (step S400). The infrared camera 10 captures the observation target on which the infrared ray is reflected (step S402). The authenticator 37 uses the captured image to perform authentication processing by face authentication (step S404). The authenticator 37 determines whether the authentication target (observation target) by the authentication processing is a specific user (step S406). When the determination in step S406 is affirmative, the infrared light source controller 38 stops the light emission of the light source 12 (step S408). Then, the authenticator 37 automatically performs login processing to release the lock state (step S410).

In a state where the lock state is released after the login processing, the determinator 36 determines whether the user has left (step S412). When the determination in step S412 is negative, the determinator 36 repeats processing step S412. When the determination in step S412 is affirmative, the authenticator 37 automatically performs logout processing (step S414). After step S414, the processing in the flowchart is ended. On the other hand, when the determination in step S406 is negative, the authenticator 37 ends the processing in the flowchart without performing login processing (step S416).

As described above, according to the embodiment, even when the apparatus produces heat, the information processing apparatus 100 can have the passive infrared sensor detect approaching or leaving of the user to manage the login state automatically. The information processing apparatus 100 can use an inexpensive passive infrared sensor to determine the presence or absence of the user in front of the own apparatus. In the information processing apparatus 100, even when the infrared sensor is affected by temperature changes, temperature correction can be performed on acquired infrared data to determine the presence or absence of the user in front of the apparatus with a simple apparatus configuration.

While the mode for carrying out the present disclosure has been described by using the embodiment, the present disclosure is not limited to the embodiment in any way, and various modifications and replacements can be added without departing from the scope of the present disclosure. For example, in the aforementioned embodiment, the laptop personal computer is exemplified as the information processing apparatus 100, but the information processing apparatus 100 is not limited thereto, and it may be a smartphone, a tablet terminal, or a desktop personal computer.

Although one embodiment of the present disclosure is described in detail with reference to the drawings as above, the specific configurations are not limited to the above-described configurations and various design changes, alterations and so forth are possible within a range not deviating from the gist of the present invention.

What is claimed is:

1. An apparatus comprising:
   an infrared sensor that passively detects infrared light radiated from an observation target;
   a heat source arranged proximate the infrared sensor;
   a determinator that determines whether the observation target is present in response to information changing along with an operational situation of the heat source and infrared data detected by the infrared sensor;
   a datastore in which a correction value for data of the infrared sensor changing along with the operational situation of the heat source is stored;
   an operational situation monitor that monitors the operational situation of the heat source; and
   wherein the determinator makes the determination in response to a change in infrared information in which the infrared data are changed based on the operational situation acquired by the operational situation monitor and the correction value stored in the datastore.

2. The apparatus of claim 1, further comprising:
a temperature detector that detects temperature changing along with the operational situation of the heat source proximate the infrared sensor; and
a datastore in which temperature data detected by the temperature detector are stored.

3. The apparatus of claim 1, wherein the heat source is an infrared light source that irradiates infrared light in response to the determinator determines that the observation target is present in a standby state.

4. The apparatus of claim 3, further comprising:
an infrared camera that operates in conjunction with the infrared light source to capture reflected light of infrared light irradiated from the infrared light source;
an authenticator that performs user authentication processing using an image captured by the infrared camera to perform login processing automatically;
an infrared light source controller that stops light emission of the infrared light source upon completion of the login processing by the authenticator; and
wherein the determinator makes the determination in response to the login processing.

5. The apparatus of claim 4, wherein the authenticator performs logout processing automatically in response to a determination that the observation target is not present after the login processing.

6. The apparatus of claim 1, further comprising a chassis having a display unit, and wherein the infrared sensor is provided at a position to face a side on which a display surface of the display unit is arranged in the chassis.

7. A method comprising:
acquiring infrared data from an infrared sensor which passively detects infrared light radiated from an observation target;
acquiring information changing along with an operational situation of a heat source adjacent the infrared sensor; and
determining whether the observation target is present in response to the information changing along with the operational situation of the heat source and infrared data acquired by the infrared sensor;
storing, in a datastore, a correction value for data of the infrared sensor changing along with the operational situation of the heat source;
monitoring, by an operational situation monitor, the operational situation of the heat source; and
making the determination in response to a change in infrared information in which the infrared data are changed based on the operational situation acquired by the operational situation monitor and the correction value stored in the datastore.

8. The method of claim 7, further comprising irradiating infrared light from an infrared light source as the heat source in response to a determination that the observation target is present in a standby state.

9. The method of claim 8, further comprising capturing reflected light of the infrared light irradiated from the infrared light source in conjunction with the infrared light source.

10. The method of claim 9, further comprising performing user authentication processing using a captured image to perform login processing.

11. The method of claim 10, further comprising stopping light emission of the infrared light source upon completion of the login processing.

12. The method of claim 11, wherein in response to a determination that the observation target is not present after the login processing, automatically performing a logout process.

13. A program product comprising a computer readable storage medium that stores code executable by a processor, the executable code comprising code to:
acquire infrared data from an infrared sensor which passively detects infrared light radiated from an observation target;
acquire information changing along with an operational situation of a heat source adjacent the infrared sensor; and
determine whether the observation target is present in response to the information changing along with the operational situation of the heat source and infrared data acquired by the infrared sensor;
store, in a datastore, a correction value for data of the infrared sensor changing along with the operational situation of the heat source;
monitor, by an operational situation monitor, the operational situation of the heat source; and
make the determination in response to a change in infrared information in which the infrared data are changed based on the operational situation acquired by the operational situation monitor and the correction value stored in the datastore.

14. The program product of claim 13, where the executable code further comprises code to cause an infrared light source to irradiate infrared light as the heat source in response to a determination that the observation target is present in a standby state.

15. The program product of claim 14, where the executable code further comprises code to capture reflected light of the infrared light irradiated from the infrared light source in conjunction with the infrared light source.

16. The program product of claim 15, where the executable code further comprises code to perform user authentication processing using a captured image to perform login processing.

17. The program product of claim 16, where the executable code further comprises code to stop light emission of the infrared light source upon completion of the login processing.

18. The program product of claim 17, where the executable code further comprises code to, in response to a determination that the observation target is not present after the login processing, automatically performing a logout process.

19. The program product of claim 13, where the executable code further comprises code to detect a temperature change along with the operational situation of the heat source in a neighborhood of the infrared sensor.

* * * * *